(12) United States Patent
Lu et al.

(10) Patent No.: US 6,718,248 B2
(45) Date of Patent: Apr. 6, 2004

(54) SYSTEM FOR DETECTING SURFACE PROFILE OF A DRIVING ROAD

(75) Inventors: Jianbo Lu, Livonia, MI (US); Todd Allen Brown, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/175,579

(22) Filed: Jun. 19, 2002

(65) Prior Publication Data
US 2003/0236606 A1 Dec. 25, 2003

(51) Int. Cl.$^7$ ............... B60G 17/00; G01C 21/00
(52) U.S. Cl. ............... 701/70; 701/90; 340/440
(58) Field of Search ............... 701/70, 90, 200, 701/213, 72, 110, 38, 37, 45, 220; 702/141, 151; 340/440; 180/282, 197

(56) References Cited

U.S. PATENT DOCUMENTS

| | | | |
|---|---|---|---|
| 4,690,553 A | 9/1987 | Fukamizu et al. | 356/51 |
| 4,765,649 A | 8/1988 | Ikemoto et al. | 280/707 |
| 4,827,416 A | 5/1989 | Kawagoe et al. | 364/424.05 |
| 4,888,696 A * | 12/1989 | Akatsu et al. | 364/424.05 |
| 5,033,770 A | 7/1991 | Kamimura et al. | 280/707 |
| 5,058,017 A | 10/1991 | Adachi et al. | 364/424.05 |
| 5,066,041 A | 11/1991 | Kindermann et al. | 280/772 |
| 5,163,319 A | 11/1992 | Spies et al. | 73/146 |
| 5,208,749 A | 5/1993 | Adachi et al. | 364/424.05 |
| 5,228,757 A | 7/1993 | Ito et al. | 303/100 |
| 5,247,466 A | 9/1993 | Shimada et al. | 364/566 |
| 5,408,411 A | 4/1995 | Nakamura et al. | 364/424.01 |
| 5,598,335 A | 1/1997 | You | 364/424.094 |
| 5,703,776 A | 12/1997 | Soung | 364/424.094 |
| 5,732,377 A | 3/1998 | Eckert | 701/426 |
| 5,736,939 A | 4/1998 | Corcoran | 340/905 |
| 5,801,647 A | 9/1998 | Survo et al. | 340/905 |
| 5,809,434 A | 9/1998 | Ashrafi et al. | 701/1 |
| 5,925,083 A | 7/1999 | Ackermann | 701/41 |
| 5,944,392 A | 8/1999 | Tachihata et al. | 303/112 |
| 6,002,974 A | 12/1999 | Schiffmann | 701/36 |
| 6,002,975 A | 12/1999 | Schiffmann et al. | 701/36 |
| 6,038,495 A * | 3/2000 | Schiffmann | 701/1 |
| 6,040,916 A | 3/2000 | Griesinger | 356/448 |
| 6,055,472 A | 4/2000 | Breunig et al. | 701/45 |
| 6,065,558 A * | 5/2000 | Wielenga | 180/282 |
| 6,141,604 A | 10/2000 | Mattes et al. | 701/1 |
| 6,185,489 B1 * | 2/2001 | Strickler | 701/29 |
| 6,192,305 B1 * | 2/2001 | Schiffmann | 701/45 |
| 6,202,020 B1 | 3/2001 | Kyrtsos | 701/80 |
| 6,233,510 B1 | 5/2001 | Platner et al. | 701/37 |
| 6,282,496 B1 * | 8/2001 | Chowdhary | 701/220 |
| 6,292,759 B1 * | 9/2001 | Schiffmann | 702/151 |
| 6,374,172 B1 * | 4/2002 | Wamaguchi et al. | 701/90 |
| 6,389,345 B2 * | 5/2002 | Phelps | 701/50 |

FOREIGN PATENT DOCUMENTS

| | | |
|---|---|---|
| EP | 1 002 709 A3 | 5/2000 |
| EP | 1 002 709 A2 | 5/2000 |
| EP | 1 110 835 A2 | 6/2001 |
| EP | 1 110 835 A3 | 8/2002 |
| SU | 1527022 A1 | 12/1989 |
| WO | WO 99/64262 | 12/1999 |

* cited by examiner

Primary Examiner—Tan Q. Nguyen
Assistant Examiner—Dalena Tran
(74) Attorney, Agent, or Firm—Gary A. Smith

(57) ABSTRACT

A control system (18) has a roll angular rate sensor (34), a yaw angular rate sensor (28), a lateral acceleration sensor (32), a longitudinal acceleration sensor (36), and four wheel speed sensors (20). The controller (26) determines a relative pitch angle and relative roll angle using the lateral acceleration signal, the longitudinal acceleration signal and the roll rate signal; a first flatness index using the roll angular rate signal, the yaw angular rate signal, the relative roll angle and a relative pitch angle; a steady state pitch angle using the vehicle speed and the longitudinal acceleration, and a steady state roll angle using the lateral acceleration, speed, and yaw rate. The controller (26) determines a second flatness index using the steady state pitch angle, the relative pitch angle, the yaw rate, the steady state roll angle and a relative roll angle.

19 Claims, 3 Drawing Sheets

SYSTEM FOR DETECTING SURFACE PROFILE OF A DRIVING ROAD

TECHNICAL FIELD

The present invention relates generally to a control apparatus for controlling a system of an automotive vehicle in response to sensed dynamic behavior, and more specifically, to a method and apparatus for controlling the system of the vehicle by determining a surface profile of the road on which the vehicle is traveling.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle rollover control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

There are two types of vehicle attitudes needed to be distinguished. One is the so-called global attitude, which is sensed by the angular rate sensors. The other is the relative attitude, which measures the relative angular positions of the vehicle with respect to the road surface on which the vehicle is driven. The global attitude of the vehicle is relative to an earth frame (or called the inertia frame), sea level, or a flat road. It can be directly related to the three angular rate gyro sensors. While the relative attitude of the vehicle measures the relative angular positions of the vehicle with respect to the road surface, which are always of various terrains. Unlike the global attitude, there are no gyro-type sensors which can be directly related to the relative attitude. A reasonable estimate is that a successful relative attitude sensing system utilize both the gyro-type sensors (when the road becomes flat, the relative attitude sensing system recovers the global attitude) and some other sensor signals.

One reason to distinguish relative and global attitude is due to the fact that vehicles are usually driven on a 3-dimensional road surface of different terrains, not always on a flat road surface. Driving on a road surface with a large road bank does increase the rollover tendency, i.e., a large output from the global attitude sensing system might well imply an uncontrollable rollover event regardless of the flat road driving and the 3-D road driving. However driving on a three-dimensional road with moderate road bank angle, the global attitude may not be able to provide enough fidelity for a rollover event to be distinguished. Vehicular rollover happens when one side of the vehicle is lifted from the road surface with a long duration of time without returning back. If a vehicle is driven on a banked road, the global attitude sensing system will pick up certain attitude information even when the vehicle does not experience any wheel lifting (four wheels are always contacting the road surface). Hence a measure of the relative angular positions of the vehicle with respect to the portion of the road surface on which the vehicle is driven provides more fidelity than global attitude to sense the rollover event when the vehicle is driven on a road with a moderate bank angle. Therefore it is important to identify road bank condition for proper vehicle rollover stability control.

Another example of detecting road profile could be used in powertrain controls, where the control of the air and fuel combination ratio or fuel ignition timing is such that they match the intention of a driver so as for the driving power or driving speed of the vehicle to match the present driving condition. Although the driver can identify the profile of a driving road and to control the vehicle accordingly, the road condition information has not been directly fed back to powertrain controls, since there is no road condition information detected and used for current vehicle control systems. Hence optimum fuel economy may not be achieved.

U.S. Pat. No. 5,703,776 considers using a gear position sensing member of a transmission, an engine revolution sensing member, a loading degree sensing, a brake pedal operating state sensing to provide a very crude measure of the longitudinal slope of the road surface. This invention provides a much more refined estimation of the road slope using the sensor sets equipped with vehicle dynamics control systems.

In another example, an active roll control system using anti-roll-bar does not respond suitably to the side bank in conventional setting, since the presence of road side bank cannot be detected and the system therefore responds to a side bank as if the vehicle were cornering. This can result in unnecessary power consumption for the active anti-roll-bar system. In order to eliminate this, WO 99/64262 provides a very crude estimation of the road side bank using lateral acceleration sensor and vehicle reference speed.

In a further example, a vehicle driven on a road with a sharp side bank may cause false activation for the yaw stability control system and/or roll stability control system due to the fact that large lateral motion is determined through sensor signals even if the vehicle is driven in steady state condition on the banked road.

Therefore, it is desirable in vehicle dynamics control and future powertrain control and vehicle controls to detect accurately the road side bank and the road longitudinal slope or pitch and to properly activate the vehicle control systems.

SUMMARY

The present invention provides a system for determining the flatness of a road on which the vehicle is traveling. In one aspect of the invention, a control system for an automotive vehicle having a vehicle body has a roll angular rate sensor generating a roll angular rate signal corresponding to an roll angular motion of the vehicle body, a yaw angular rate sensor generating a yaw rate signal corresponding to a yaw motion of the vehicle body, a lateral acceleration sensor generating a lateral acceleration signal corresponding to a lateral acceleration of a center of gravity of the vehicle body, a longitudinal acceleration sensor generating a longitudinal acceleration signal corresponding to the longitudinal acceleration of the center of gravity of the vehicle body, a wheel speed sensor generating a wheel speed signal corresponding to a wheel speed of the vehicle. A controller is coupled to the roll angular rate sensor, the yaw angular rate sensor, the lateral acceleration sensor, the longitudinal acceleration sensor, and the wheel speed sensor. The controller determines a relative pitch angle and a relative roll angle as a function of the lateral acceleration signal, the longitudinal acceleration signal and the roll rate signal. The controller determines a first flatness index as a function of the roll angular rate signal, the yaw angular rate signal, the relative roll angle and a relative pitch angle. The controller determines a steady state pitch angle as a function of the vehicle speed and the longitudinal acceleration. The controller also determines a steady state roll angle as a function of lateral acceleration, vehicle speed and yaw rate. The controller determines a second flatness index as a function of the steady state pitch angle, the relative pitch angle, the yaw rate, the steady state roll angle and a relative roll angle.

In a further aspect of the invention, a method of controlling an automotive vehicle comprises estimating a first flatness index indicative of road flatness, estimating a second flatness index indicative of road flatness, determining a pitch slope in response to the first flatness index and the second flatness index, and determining a bank angle in response to the first flatness index and the second flatness index.

One advantage of the invention is that one angular rate sensor such as a pitch rate sensor may be eliminated.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
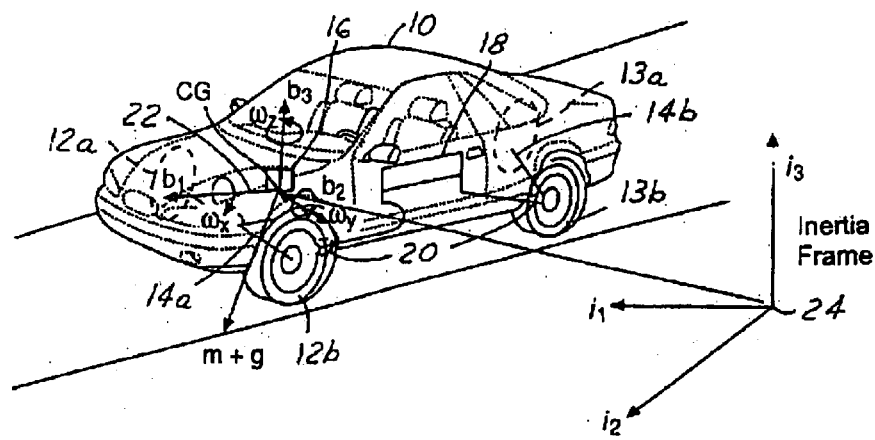
FIG. 1 is a diagrammatic view of a vehicle with variable vectors and coordinator frames according to the present invention.

In the following figures the same reference numerals will be used to identify the same components. The present invention is preferably used in conjunction with a yaw control system or a rollover control system for an automotive vehicle. However, the present invention may also be used with a deployment device such as airbag or roll bar. The present invention will be discussed below in terms of preferred embodiments relating to an automotive vehicle moving in a three-dimensional road terrain.

Referring to FIG. 1, an automotive vehicle 10 with a safety system of the present invention is illustrated with the various forces and moments thereon. Vehicle 10 has front right and front left tires 12a and 12b and rear right tires and rear left tires 13a and 13b, respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 preferably uses a standard yaw stability control sensor set (including lateral acceleration sensor, yaw rate sensor, steering angle sensor and wheel speed sensor) together with a roll rate sensor and a longitudinal acceleration sensor. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $w_x$ for the roll rate, $w_y$ for the pitch rate and $w_z$ for the yaw rate. The present invention calculations preferably take place in an inertial frame 24 that may be derived from the body frame 22 as described below.

The angular rate sensors and the acceleration sensors are mounted on the vehicle car body along the body frame directions $b_1$, $b_2$ and $b_3$, which are the x-y-z axes of the vehicle's sprung mass.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four tire/road contact patches.

In the following discussion, the Euler angles of the body frame $b_1 b_2 b_3$ with respect to the road frame $r_1 r_2 r_3$ are denoted as $\theta_{xr}$, $\theta_{yr}$ and $\theta_{zr}$, which are also called the relative Euler angles.

The present invention estimates the relative Euler angles $\theta_{xr}$ and $\theta_{yr}$ based on the available sensor signals and the signals calculated form the measured values.

Figure 2:
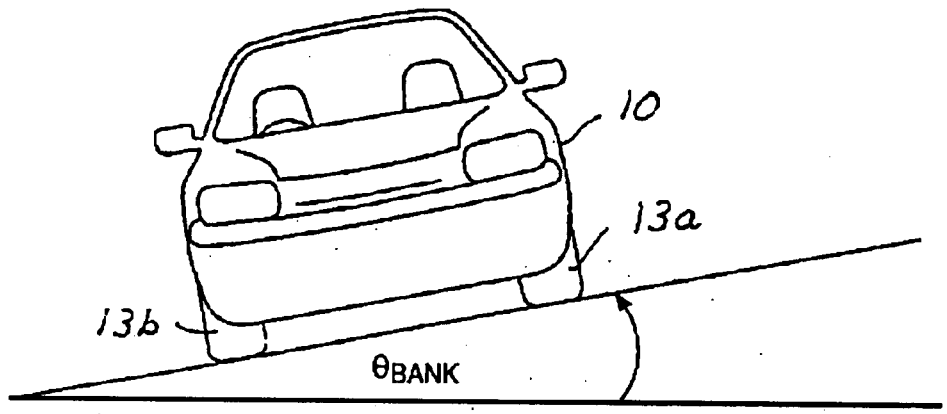
FIG. 2 is an end view of an automotive vehicle on a bank.

Referring now to FIG. 2, the present invention determines a road bank angle $\Theta_{bank}$, which is shown relative to the vehicle 10 on a road surface.

Figure 3:
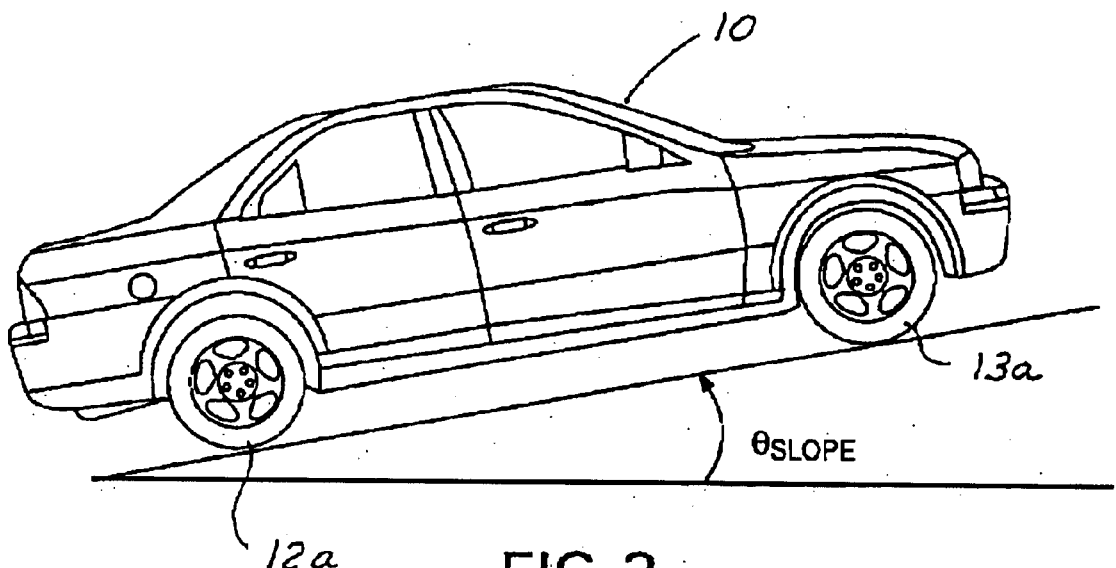
FIG. 3 is a side view of a vehicle on a pitch slope.

Referring now to FIG. 3, the present invention determines a slope or pitch angle $\Theta_{slope}$, which is shown relative to the vehicle 10 on the road surface.

Figure 4:
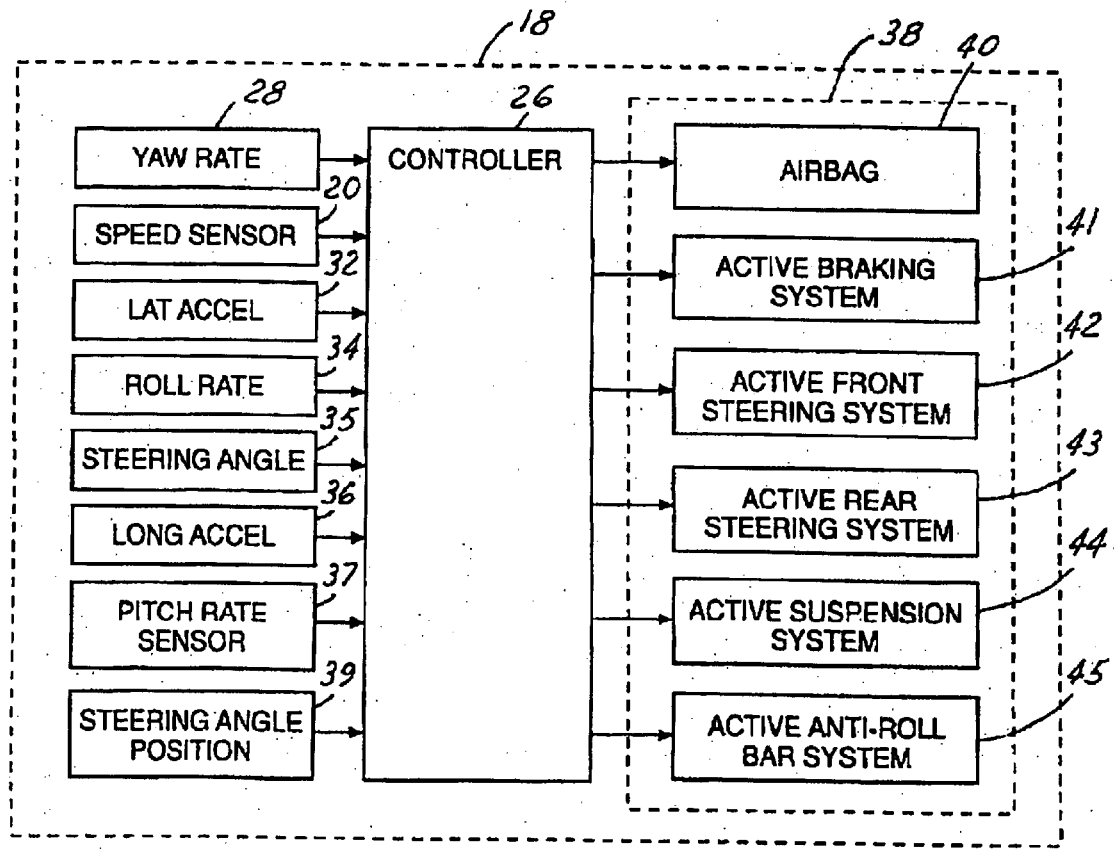
FIG. 4 is a block diagram of a stability system according to the present invention.

Referring now to FIG. 4, roll stability control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand wheel position) 35, a longitudinal acceleration sensor 36, a pitch rate sensor 37 and steering angle position sensor 39.

In the preferred embodiment, only two axial rate sensors are used. When two of these axial rates are known, the other may be derived using other commonly available sensors. Preferably, yaw rate and roll rate are used as the axial rate sensors. Although pitch rate sensor 37 is illustrated, it can be eliminated in the preferred embodiment.

In the preferred embodiment, the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 28–39 may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40–45 may have their own controllers for activating each one. As mentioned above, the safety system 38 is preferably at least the active braking system 41.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 28 through 39, controller 26 determines a roll condition and controls any one or more of the safety devices 40–45.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

As mentioned above, $\Theta_{bank}$ and $\Theta_{slope}$ are the road side bank angle and longitudinal slope angle experienced by a vehicle driven. These variables are preferably factored into the control algorithm of a rollover stability control system, or a yaw stability control system or other safety systems. Two variables $FI_1$ and $FI_2$ are used here, which are called flatness index 1 and flatness index 2. These variables are defined as:

$$FI_1 = \dot{\Theta}_{bank} + \omega_z \Theta_{slope} \qquad (1.1)$$

$$FI_2 = \Theta_{slope} - \omega_z \int_0^t \Theta_{bank}(\tau) d\tau$$

where $\omega_z$ is the yaw rate of the vehicle. $FI_1$ and $FI_2$ have the following properties:

If the road surface is absolutely flat, then both $\theta_{bank}$ and $\theta_{slope}$ should be zero, hence $FI_1$ and $FI_2$ are both zero.

If the road surface is close to perfect flatness, $FI_1$ and $FI_2$ should be close to zero.

If the road surface doesn't have longitudinal slope, $FI_1=0$ means the road might have zero bank or constant bank. If further $FI_2=0$, then the road must be flat if the yaw rate is non-zero.

Based on the above discussion, a small magnitude for both flatness indices $FI_1$ and $FI_2$ does indicate that the road surface under driving is close to a flat surface. To detect when the road is flat, the flatness indices $FI_1$ and $F1_2$ are checked using available sensor signals. In the preferred embodiment, the lateral acceleration $a_y$, the longitudinal acceleration $a_x$, the roll rate $\omega_x$ and yaw rate $\omega_z$, and the calculated vehicle reference velocity $V_{ref}$. Of course, the pitch rate or other signals may be used while the other variables may be calculated.

The relative roll and pitch angles between the vehicle car body and the road surface are denoted as $\theta_{xr}$ and $\theta_{yr}$, which can be computed using the methods summarized in U.S. patent application [Ford invention disclosure 200–1749] filed on Mar. 4, 2002, the disclosure of which is incorporated by reference herein. If we compute the following at each time instant k $$RA(k) = a\dot{\omega}_x(k) - ba_y(k)$$

$$PA(k) = a\dot{\omega}_y(k) - da_x(k)$$

with properly chosen coefficients a,b,c and d, and an estimated pitch rate $\hat{\omega}_y$ (which is a function of the roll rate, yaw rate, etc.) or a measured pitch rate $\omega_y$, then the computation for the relative roll and pitch angles proposed in the above patent application can be conducted as in the following $$\theta_{xr}(k+1) = e\theta_{xr}(k) + f[RA(k+1) + RA(k)]$$

$$\theta_{yr}(k+1) = g\theta_{yr}(k) + h[PA(k+1) + PA(k)]$$

with properly chosen coefficients e,f,g and h.

The vehicle body global roll and pitch angles $\theta_x$ and $\theta_y$, which are measured with respect to sea level, can be computed as $$\theta_x = \Theta_{bank} + \theta_{xr}$$

$$\theta_y = \Theta_{Slope} + \theta_{yr} \qquad (1.2)$$

Notice that, $\theta_x$ and $\theta_y$ obey the following relationship with reasonable accuracy $$\dot{\theta} \approx \omega_x + \omega_z \theta_y \quad (1.3)$$

The estimated variable $\hat{\Gamma}_1$ is defined based on the roll and yaw rate sensor measurements, and the calculated relative roll and pitch attitudes of the vehicle (which are further calculated from the longitudinal/lateral acceleration sensor measurements, and the roll rate sensor measurement.

$$\hat{\Gamma}_1 = \omega_x + \omega_z \theta_{yr} - \dot{\theta}_{xr} \quad (1.4)$$

At the k-th time instant, the digital implementation of Equation (1.4) can be written as the following $$\hat{\Gamma}_1(k) = \omega_x(k) + \omega_z(k)\theta_{yr}(k) - \dot{\theta}_{xr}(k) \quad (1.5)$$

Based on (1.2) and (1.3), the flatness index $FI_1$ can be approximately computed from $\hat{\Gamma}_1$, or say $$FI_1(k) \approx \hat{\Gamma}_1(k).$$

Considering $$a_x = \dot{v}_x - \omega_z v_y - g\theta_y$$

$$a_y = \dot{v}_y + \omega_z v_x + g\theta_x \quad (1.6)$$

The steady state roll and pitch attitudes of the vehicle may be defined as $$\theta_{yss} = \frac{\dot{v}_x - a_x}{g} \quad (1.7)$$

$$\theta_{xss} = \frac{a_y - \omega_z v_x}{g}$$

The estimated variable $\hat{\Gamma}_2$ is based on the steady state roll and pitch attitudes computed in (1.6) and the relative roll and pitch attitude (angle)

$$\hat{\Gamma}_2 = (\theta_{yss} - \theta_{yr}) - \omega_z \int_0^t [\theta_{xss}(\tau) - \theta_{xr}(\tau)]d\tau \quad (1.8)$$

A digital implementation of (1.8) is used in practice. In order to eliminate potential integration drift, an anti-drift-integration filter of the following z-transformation may be used $$T_{AID}(z^{-1}) = \frac{d(1-z^{-2})}{1 - c_1 z^{-1} + c_2 z^{-2}}$$

If we define $$\Xi = \int_0^t [\theta_{xss}(\tau) - \theta_{xr}(\tau)]d\tau$$

then by passing $$\theta_{xss}(k) - \theta_{xr}(k)$$

through this filter, $\Theta$ can be computed as the following $$\Xi(k+1) = c_1 \Xi(k) - c_2 \Xi(k-1) + \quad (1.9)$$
$$d[\theta_{xss}(k+1) - \theta_{xr}(k+1)] -$$
$$d[\theta_{xss}(k-1) - \theta_{xr}(k-1)]$$

and $\hat{\Gamma}_2$ may be then be expressed as the following $$\hat{\Gamma}_2(k+1) = \theta_{yss}(k+1) - \theta_{yr}(k+1) - \omega_z(k+1)\Xi(k+1) \quad (1.10)$$

By eliminating lateral velocity $v_y$ from (1.6), the following holds $$\omega_z \int_0^t \theta_x(\tau)d\tau - \theta_y = \omega_z \int_0^t \theta_{xss}(\tau)d\tau - \theta_{yss} \quad (1.11)$$

Thus, the calculated or estimate $\hat{\Gamma}_2$ is equivalent to the flatness index $FI_2$. That is, $$FI_2(k) = \hat{\Gamma}_2(k)$$

at each time instant.

Using the calculated $\hat{\Gamma}_1$ and $\hat{\Gamma}_2$, the following flat road detection logic can be obtained as in the following if $\hat{\Gamma}_1(k) \leq \min_1$ and $\hat{\Gamma}_2(k) \leq \min_2$

{ road surface is almost flat

} else if $\hat{\Gamma}_1(k) <= \min_1$ and $\hat{\Gamma}_2(k) \geq \min_2$

{ road doesn't have dynamic side bank quantitatively computing bank/slope

} else if $\hat{\Gamma}_1(k) >= \max_1$ and $\hat{\Gamma}_2(k) \geq \min_2$

{ road has significant side bank/slope quantitatively computing bank/slope

} else

{ quantitatively computing bank and slope

} where $\max_1$ and $\max_2$ are thresholds. When the thresholds are exceeded, the road is not flat. The road pitch angle and the road bank angle may be used in the controlling of a safety device. That is, when the flatness indices are not small enough, the bank and pitch/slope is determined. In order to do so, the previously computed estimates $\hat{\Gamma}_1$ and $\hat{\Gamma}_2$ are used to formulate the following ordinary differential equations.

The following differential equations derived from (1.1) are obtained.

$$\dot{\Theta}_{bank} + \omega_z \Theta_{slope} = \hat{\Gamma}_1 \quad (1.12)$$

$$\Theta_{slope} - \omega_z \int_0^t \Theta_{bank}(\tau)d\tau = \hat{\Gamma}_2$$

In order to solve $\Theta_{bank}$ and $\Theta_{slope}$ from the differential equation (1.12), $\Theta_{slope}$ is eliminated.

$$\dot{\Theta}_{bank} + \omega_z^2 \int_0^t \Theta_{bank}(\tau)d\tau = \hat{\Gamma}_1 + \omega_z \hat{\Gamma}_2 \quad (1.13)$$

If the road bank is computed from (1.13), then the road slope can be expressed as $$\Theta_{slope} = \hat{\Gamma}_2 + \omega_z \int_0^t \Theta_{bank}(\tau)d\tau \qquad (1.14)$$

If we define the yaw angle $\Omega_1$ and an intermediate flatness variable as:

$$\Omega_t = \int_0^t \omega_z(\tau)d\tau \qquad (1.15)$$

$$\Gamma = \Gamma_1 + \omega_z \Gamma_2$$

then the road bank angle obeying (1.13) can be expressed as in the following:

$$\Theta_{bank}(t) = \sin(\Omega_t)\int_0^t \Gamma(\tau)\sin(\Omega_\tau)d\tau + \cos(\Omega_t)\int_0^t \Gamma(\tau)\cos(\Omega_\tau)d\tau \qquad (1.16)$$

The numerical implementation of the closed-form solution in (1.16) is used in practice. The yaw angle of the vehicle car body $\Omega_1$, as defined in (1.15), may be computed using the following pure integration scheme $$\Omega(k+1)=\Omega(k)+\omega_z(k+1)\Delta T \qquad (1.17)$$

where $\Delta T$ is the sampling time of the control system, $\Omega(k+1)$ and $\omega_z(k+1)$ are the values of the yaw angle and the yaw rate sensor at time instant $t=(k+1)\Delta T$. Since the potential drift problem, (1.17) may not be close to the actual yaw angle. However $\Omega(k+1)$ appears only in sin,cos functions, the drifting could be eliminated by using the following congruent mod operation $$\Omega_g(k+1) = \Omega(k+1) - 2\pi\text{floor}\left\{\frac{\Omega(k+1)}{2\pi}\right\} \qquad (1.18)$$

Notice that $\Omega_g(k+1)$ falls always within 0 and $2\pi$. The floor(•) is a function which is the largest integer bounded by the real number •. That is, $$\text{floor}\left\{\frac{\Omega(k+1)}{2\pi}\right\}$$

always removes out of the portion that are integer times of $2\pi$ from $\Omega(k+1)$, and it outputs a quantity with value falling in between 0 and $2\pi$. This function is common in "C" programming language. The following intermediate variables may be computed.

$$\Gamma_{SI}(k+1) = c_1\Gamma_{SI}(k) - c_2\Gamma_{SI}(k-1) + \qquad (1.19)$$

$$d[\Gamma(k+1)\sin(\Omega_g(k+1)) - \Gamma(k-1)\sin(\Omega_g(k-1))]$$

$$\Gamma_{CI}(k+1) = c_1\Gamma_{CI}(k) - c_2\Gamma_{CI}(k-1) +$$

$$d[\Gamma(k+1)\cos(\Omega_g(k+1)) - \Gamma(k-1)\cos(\Omega_g(k-1))]$$

Using the numerical scheme shown in (1.13), the following computation for the road bank and road slope angles can be provided where $\Psi$ is an intermediate variable.

$$\Theta_{bank}(k+1)=\sin(\Omega(k+1))\Gamma_{SI}(k+1)+\cos(\Omega(k+1))\Gamma_{CI}(k+1)$$

$$\Psi(k+1)=\Psi(k)+\Delta T\Theta_{bank}(k+1)$$

$$\Theta_{slope}(k+1)=\hat{\Gamma}_2(k+1)+\omega_z(k+1)\Psi(k+1) \qquad (1.20)$$

Figure 5:
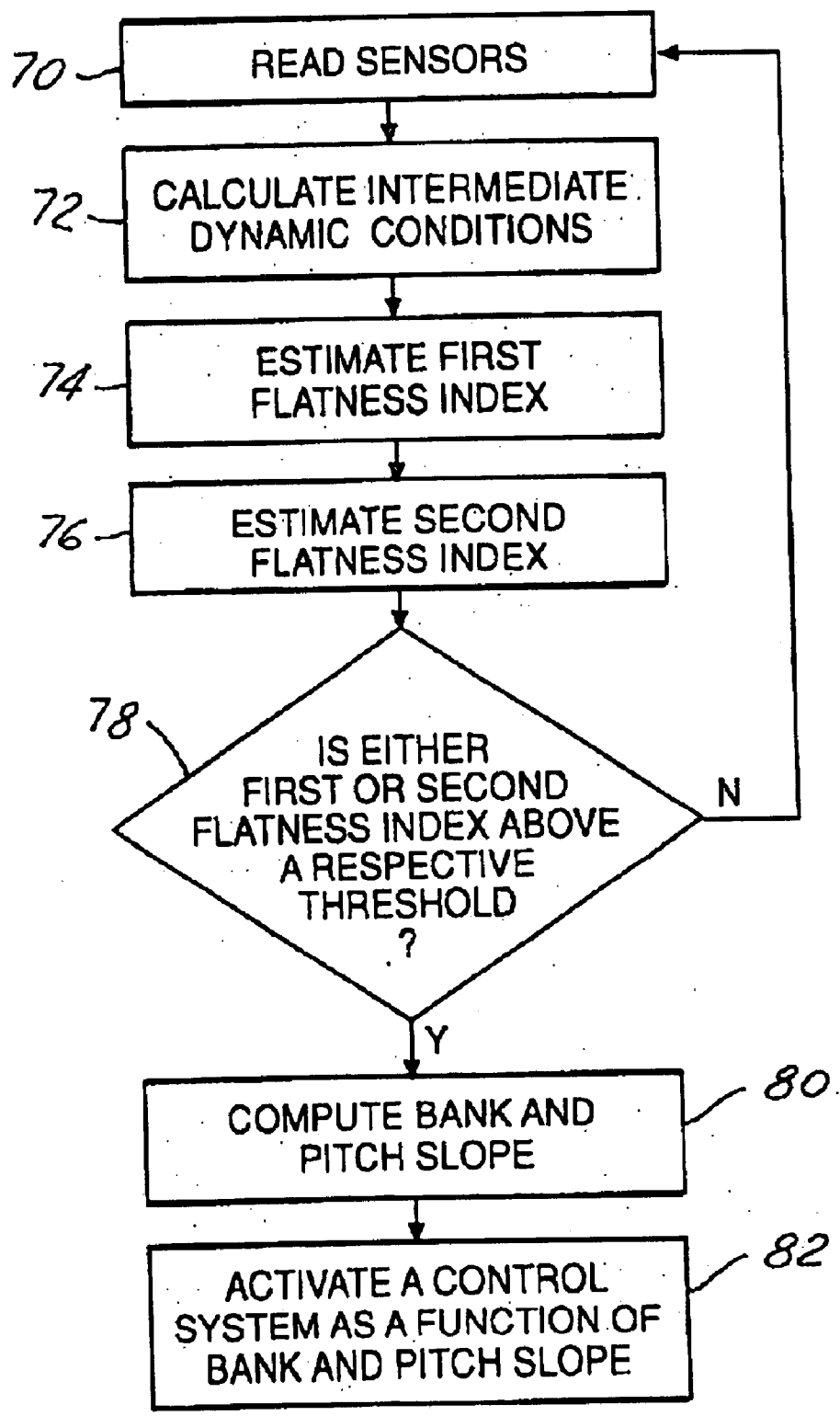
FIG. 5 is flow chart of the operation according to the present invention.

Referring now to FIG. 5, a summary of the method presented above is illustrated in flow chart form. In step 70, the various sensors are read. In the present example, a roll rate sensor determines the roll rate of the vehicle, a lateral acceleration sensor generates a lateral acceleration signal of the vehicle body, a longitudinal acceleration sensor generates a longitudinal acceleration signal of the vehicle body, a yaw rate sensor generates a yaw rate signal. A longitudinal vehicle velocity or speed is also obtained. In step 72, a number of intermediate dynamic conditions are determined from he measured sensor signal. The intermediate dynamic conditions may include pitch rate, relative pitch angle, relative roll rate, relative roll angle, steady state pitch angle, steady state roll angle, and global references of the conditions. In step 74, a first flatness index is calculated from the conditions. This calculation is an estimate as described above. In step 76, a second flatness index is calculated from the conditions. This calculation is also an estimate as described above.

In step 78 if either the first index or the second index (or both) are above a threshold this indicates the road has a significant side bank or pitch slope. Step 80 is then executed. The bank and pitch slope are computed from the flatness indexes and various dynamic conditions as mentioned above. In step 82, a control system is activated as a function of bank and pitch slope. For example, when the bank and pitch slope are high, this may indicate an off-road condition, not a rollover condition. This may allow the rollover control system to adjust its rollover thresholds accordingly.

Referring back to step 78, if either index is not above their respective thresholds, step 70 is executed.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a vehicle body comprising:

a first angular rate sensor generating a first angular rate signal corresponding to a first angular motion of the vehicle body;

a second angular rate sensor generating a second motion signal corresponding to a second angular motion of the vehicle body;

a lateral acceleration sensor generating a lateral acceleration signal corresponding to a lateral acceleration of a center of gravity of the vehicle body;

a longitudinal acceleration sensor generating a longitudinal acceleration signal corresponding to the longitudinal acceleration of the center of gravity of the vehicle body;

a wheel speed sensor generating a wheel speed signal corresponding to a wheel speed of the vehicle; and a controller coupled to said first angular rate sensor, said second angular rate sensor, said lateral acceleration sensor, said longitudinal acceleration sensor, and said wheel speed sensor, said controller determining a first flatness index and a second flatness index from the first angular rate signal, the second angular rate signal, the lateral acceleration signal and the longitudinal acceleration signal, and the speed signal, said controller determining a road slope or pitch angle and a road bank angle in response to the first flatness index and the second flatness index.

2. A system as recited in claim 1 wherein said first angular rate sensor is one selected from the group of a yaw rate sensor, a pitch rate sensor and a roll rate sensor and said second angular rate sensor comprises is one selected from the group of a yaw rate sensor, a pitch rate sensor and a roll rate sensor, said second sensor being different than the first sensor.

3. A control system for an automotive vehicle having a vehicle body comprising:
   a roll angular rate sensor generating a roll angular rate signal corresponding to an roll angular motion of the vehicle body;
   a yaw angular rate sensor generating a yaw rate signal corresponding to a yaw motion of the vehicle body;
   a lateral acceleration sensor generating a lateral acceleration signal corresponding to a lateral acceleration of a center of gravity of the vehicle body;
   a longitudinal acceleration sensor generating a longitudinal acceleration signal corresponding to the longitudinal acceleration of the center of gravity of the vehicle body;
   a wheel speed sensor generating a wheel speed signal corresponding to a wheel speed of the vehicle; and
   a controller coupled to said roll angular rate sensor, said yaw angular rate sensor, said lateral acceleration sensor, said longitudinal acceleration sensor, and said wheel speed sensor, said controller determining a relative pitch angle and relative roll angle as a function of the lateral acceleration signal, the longitudinal acceleration signal and the roll rate signal, determining a first flatness index as a function of the roll angular rate signal, the yaw angular rate signal, the relative roll angle and a relative pitch angle, said controller determining a steady state pitch angle as a function of the vehicle speed and the longitudinal acceleration, said controller determining a steady state roll angle as a function of lateral acceleration, vehicle speed and yaw rate, said controller determining a second flatness index as a function of the steady state pitch angle, the relative pitch angle, the yaw rate, the steady state roll angle and a relative roll angle.

4. A control system as recited in claim 3 further comprising a safety system coupled to said controller, said controller generating a control signal to said safety system as a function of the first flatness index and the second flatness index.

5. A control system as recited in claim 4 wherein said safety system comprises an active brake control system.

6. A control system as recited in claim 4 wherein said safety system comprises an active rear steering system.

7. A control system as recited in claim 4 wherein said safety system comprises an active front steering system.

8. A control system as recited in claim 4 wherein said safety system comprises an active anti-roll bar system.

9. A control system as recited in claim 4 wherein said safety system comprises an active suspension system.

10. A method controlling an automotive vehicle comprising:
    estimating a first flatness index indicative of road flatness;
    estimating a second flatness index indicative of road flatness;
    determining a road pitch slope in response to the first flatness index and the second flatness index; and
    determining a road bank angle in response to the first flatness index and the second flatness index.

11. A method as recited in claim 10 further comprising the step of controlling a safety device as a function of the bank angle and the pitch slope of the driving road.

12. A method as recited in claim 10 wherein the safety device comprises a yaw control system.

13. A method as recited in claim 10 wherein the safety device comprises a rollover stability control system.

14. A method as recited in claim 10 wherein determining a road pitch slope in response to the first flatness index and the second flatness index and determining a road bank angle in response to the first flatness index and the second flatness index are performed when the first flatness index and the second flatness index are above a predetermined threshold.

15. A method as recited in claim 10 further comprising:
    determining a roll angular rate signal, a yaw angular rate signal, a relative roll angle and a relative pitch angle;
    wherein the first flatness index is a function of a first flatness index as a function of the roll angular rate signal, the yaw angular rate signal, the relative roll angle and a relative pitch angle •.

16. A method as recited in claim 10 further comprising:
    determining a steady state pitch angle, a relative pitch angle, a yaw rate, a steady state roll angle and a relative roll angle;
    wherein the second flatness index is a function of the steady state pitch angle, the relative pitch angle, the yaw rate, the steady state roll angle and a relative roll angle.

17. A method of controlling an automotive vehicle comprising:
    measuring a roll rate of the vehicle body;
    measuring a lateral acceleration of the vehicle body;
    measuring the longitudinal acceleration of the vehicle body;
    measuring the yaw rate of the vehicle body;
    measuring a vehicle speed;
    determining a relative pitch angle and relative roll angle as a function of the lateral acceleration, the longitudinal acceleration and the roll rate signal;
    determining a first flatness index as a function of the roll angular rate, the yaw angular rate, the relative roll angle and a relative pitch angle;
    determining a steady state pitch angle as a function of the vehicle speed and the longitudinal acceleration;
    determining a steady state roll angle as a function of lateral acceleration, longitudinal speed and yaw rate;
    a determining a second flatness index as a function of the steady state pitch angle, the relative pitch angle, the yaw rate, the steady state roll angle and a relative roll angle; and
    generating a control signal as a function of the first flatness index and the second flatness index.

18. A method as recited in claim 17 activating a safety device as a function of the road bank angle and the road pitch angle.

19. A method as recited in claim 17 wherein said step of activating a safety device comprises one selected from the group consisting of an active brake control system, an active rear steering system, an active front steering system, an active anti-roll bar system, and an active suspension system.

* * * * *